United States Patent [19]

Delamare

[11] Patent Number: 5,893,517
[45] Date of Patent: Apr. 13, 1999

[54] MAGNETOFLUIDIC SUSPENSION TURBINE

[75] Inventor: Jérôme Delamare, Grenoble, France

[73] Assignee: Sames, S.A., Meylan, France

[21] Appl. No.: 08/889,350

[22] Filed: Jul. 8, 1997

[30] Foreign Application Priority Data

Jul. 10, 1996 [FR] France .................. 96 08608

[51] Int. Cl.⁶ .................................. B05B 5/04
[52] U.S. Cl. .............. 239/223; 310/90.5; 335/225
[58] Field of Search .................. 239/223, 224, 239/263, 264; 310/90.5; 335/225

[56] References Cited

U.S. PATENT DOCUMENTS

| | | |
|---|---|---|
| 3,890,019 | 6/1975 | Boden et al. . |
| 3,938,863 | 2/1976 | Victor et al. .................. 308/9 |
| 4,214,708 | 7/1980 | Lacchia .................. 239/703 |
| 4,467,968 | 8/1984 | Morishita et al. .................. 239/703 |
| 4,700,890 | 10/1987 | Hasegawa .................. 239/103 |
| 4,811,906 | 3/1989 | Prus . |
| 4,970,422 | 11/1990 | Lind .................. 310/90 |
| 5,078,321 | 1/1992 | Davis et al. .................. 239/224 |
| 5,111,102 | 5/1992 | Meeks . |
| 5,153,475 | 10/1992 | McSparan .................. 310/254 |
| 5,315,197 | 5/1994 | Meeks et al. . |
| 5,514,924 | 5/1996 | McMullen et al. . |
| 5,584,435 | 12/1996 | Lind .................. 239/73 |

FOREIGN PATENT DOCUMENTS

| | | |
|---|---|---|
| 0 209 447 A1 | 1/1993 | European Pat. Off. . |
| 0 567 436 A1 | 10/1993 | European Pat. Off. . |
| 0 662 349 A1 | 7/1995 | European Pat. Off. . |
| 52-32447 | 3/1977 | Japan .................. 310/90.5 |
| 54-8248 | 1/1979 | Japan .................. 310/90.5 |
| 59-37330 | 2/1984 | Japan .................. 310/90.5 |
| 2219357 | 6/1989 | United Kingdom .................. 310/90.5 |

OTHER PUBLICATIONS

Search Report from French Patent Office for counterpart French Application No. FR 9608608, Mar. 20, 1997.

*Primary Examiner*—Andres Kashnikow
*Assistant Examiner*—Jorge S. Bocanegra
*Attorney, Agent, or Firm*—Wallenstein & Wagner, Ltd.

[57] ABSTRACT

A magnetofluidic suspension turbine combines a fluidic bearing and a magnetic circuit comprising a magnet in the stator and an airgap defined between polepieces of a ferromagnetic circuit between the rotor and the stator. This ferromagnetic circuit includes facing centering members on opposite sides of the airgap.

13 Claims, 1 Drawing Sheet

MAGNETOFLUIDIC SUSPENSION TURBINE

BACKGROUND OF THE INVENTION

1. Field of the Invention

The invention relates to a magnetofluidic suspension turbine of the type combining a radial fluidic bearing and a magnetic circuit adapted to generate a dynamic recentering return force on radial displacement of the rotor relative to the stator. The invention is more particularly concerned with an improvement to said magnetic circuit. A turbine of this kind can be used to drive a coating product sprayer member, which is generally in the form of a bowl, at a high rotation speed.

2. Description of the Prior Art

Document EP 0 567 436 describes a turbine of the above kind comprising a stator and a rotor and in which air injector means are provided to feed a laminar space defined between two respective facing plane surfaces (perpendicular to the required theoretical rotation axis of the rotor) of the rotor and of the stator and forming a radial fluidic bearing. This fluidic bearing is balanced by a magnetic circuit, part of which is in said rotor and part of which is in said stator and which comprises a defined radial airgap in substantially the same plane as the laminar space of the fluidic bearing. The magnetic circuit of the prior art device is remarkable in that it comprises magnets radially inside and magnets radially outside of the rotor and the stator, respectively, the magnets facing each other and being disposed symmetrically about the plane of the airgap.

Although a system of this kind is satisfactory in use, its industrial manufacture encounters a number of difficulties, in particular requiring difficult adjustments.

The difficulties encountered include the fact that the circumferencial field generated by an annular magnet is not homogeneous. Because of this, the magnetic axis of the rotor is rarely coincident with its geometrical axis. This can lead to an imbalance when the rotor is rotating at high speed; this defect is difficult to correct. Moreover, the magnets are glued into the rotor. It is therefore difficult to control the magnetic centering of the magnets and the size of the airgap, which causes disparities from one turbine to another.

For all these reasons it can be necessary to combine rotors and stators in matched pairs, which can subsequently lead to maintenance problems should it prove necessary to change the rotor. Finally, rare earth magnets have relatively low resistance to the centrifugal forces generated at high rotation speeds. The risk of a magnet of this kind bursting obliges the manufacturer to adopt a particular form of assembly (banding) around the magnets in the rotor. The invention eliminates all these disadvantages.

SUMMARY OF THE INVENTION

To be more precise, the invention consists in a magnetofluidic suspension turbine comprising a stator, a rotor, a radial fluidic bearing defined between said rotor and said stator, fluid injection means for injecting fluid into a laminar space between two respective facing plane surfaces of said rotor and of said stator, and a magnetic circuit part of which is in said rotor and part of which is in said stator and which includes an airgap in substantially the same plane as said laminar space, a magnet and a ferromagnetic circuit coupled to said magnet and including facing centering members on opposite sides of said airgap to channel the magnetic flux between them via said airgap and to generate a return force upon radial displacement of said rotor relative to said stator.

The aforementioned two plane surfaces defining said laminar space are perpendicular to the required theoretical rotation axis of the rotor; this axis is coincident with that of the stator, which is also the main axis of the turbine.

In accordance with one advantageous feature of the invention, the turbine includes a single annular magnet centered on the theoretical rotation axis of the rotor and this magnet is housed in the stator; it is therefore not subjected to centrifugal forces. Furthermore, even if the permanent magnet proper is not homogeneous, as mentioned above, the ferromagnetic parts coupled to the magnet are homogeneous. The magnetic field is therefore homogeneous at the airgap and the magnetic axis of the system coincides with the rotation axis. The magnet can be an electromagnet.

In one currently preferred embodiment of the invention the centering members are annular ribs on the ferromagnetic circuit, disposed coaxially in facing pairs in the rotor and the stator. In the rotor and in the stator, the annular ribs are preferably radially inside and radially outside the fluidic bearing. The latter has an annular amagnetic material part in the stator surrounded by parts of said magnetic circuit and in which is defined an annular distribution chamber connected to a source of fluid under pressure (compressed air) and communicating with said laminar space through a series of small holes around a circle centered on the theoretical rotation axis of said rotor.

Finally, it is important to note that the facing faces of said annular ribs of the rotor and of the stator can be machined in situ, with a respective predetermined axial offset relative to the aforementioned two plane surfaces delimiting said laminar space of said fluidic bearing. The airgap of the magnetic circuit and its axial position relative to said laminar space of said fluidic bearing can therefore be adjusted with great precision.

The invention will be better understood and other advantages of the invention will emerge more clearly from the following description of a magnetofluidic suspension turbine in accordance with the invention given by way of example only and with reference to the accompanying drawing.

DETAILED DESCRIPTION OF THE PREFERRED EMBODIMENT

Figure 1:
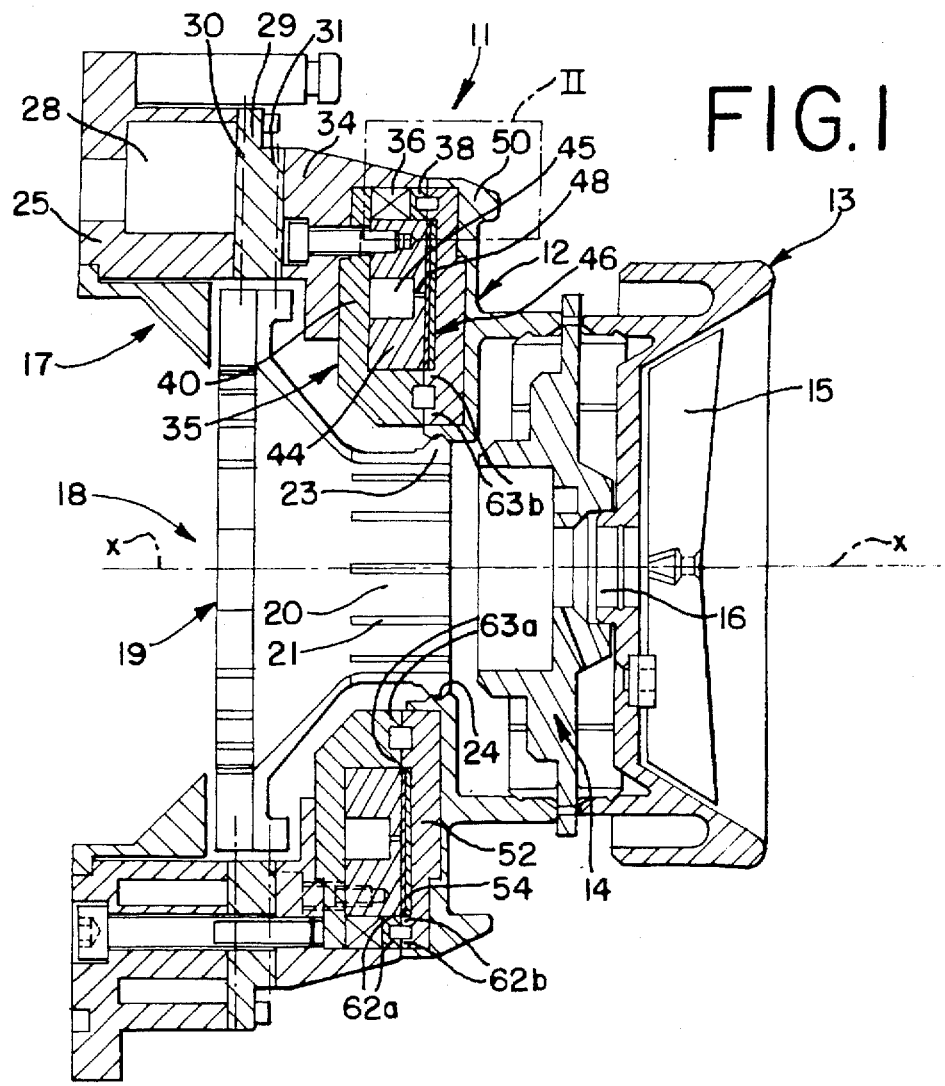
FIG. 1 is a general view of a turbine of this kind in longitudinal section.

The drawing shows a magnetofluidic suspension turbine 11 the rotor 12 of which carries and rotates a centrifugal sprayer member 13 in the general form of a cup or bowl through an intermediate mounting part 14 made of a plastics material such as polyamide, for example. The sprayer member 13 includes a central deflector 15. The coating product is fed into an axial bore 16 and the centrifugal force causes it to spread out in the space defined between the inner wall of the sprayer member and the deflector 15, until it reaches the rounded sprayer edge. The deflector 15 has small inclined passages near its center and opening onto its front face for cleaning the latter using solvent injected instead of the coating product during a sprayer member cleaning phase, for example on changing color.

The turbine proper comprises the rotor 12 and a stator 17. These two subassemblies have a globally annular configuration. The stator therefore has a large central cavity 18 housing a blade wheel 19 clipped to the inside periphery of the rotor 12. To this end, the blade wheel 19 is extended axially by a sleeve 20 with slots 21 parallel to its axial direction and conferring a certain degree of radial elasticity on it. This sleeve has a bead 23 on its outside edge engaged in an annular groove 24 defined on the inside edge of the rotor.

The stator 17 comprises a number of annular parts assembled together. A first part 25 includes an annular chamber 28 connected to a source of fluid under pressure, i.e. compressed air. A second annular part 29, contiguous with the first and closing the chamber 28, includes injectors 30 in communication with said annular chamber 28 to direct air onto the blades of the blade wheel to rotate it. Other injectors 31 are formed in this annular part to direct air onto braking notches 32 of the same blade wheel. The injectors 30 and 31 are shown by phantom lines in FIG. 1.

The third annular part 34 contiguous with and fixed to the second provides a support for the stator part of the magnetofluidic suspension system. The third part therefore has a magnetic circuit part 35 comprising a magnet 36 and two annular polepieces 38, 40, a ferromagnetic (mild steel) circuit and one part of a radial fluidic bearing, namely an amagnetic material annular part 44 surrounded by the members of the magnetic circuit referred to above. An annular distribution chamber 45 connected to a source of fluid under pressure (compressed air) is defined in the part 44 and closed by the polepiece 40. Its front exterior face 44a constitutes a plane radial surface forming part of a radial fluidic bearing 46. The chamber 45 feeds the latter via a series of small holes 48 around a circle centered on the theoretical rotation axis x—x of the rotor. This axis is also the main axis of symmetry of the cavity 18 of the stator in which the blade wheel is accommodated. It is the effective rotation axis of the rotor under stationary conditions, i.e. when the latter is not subject to any recentering force.

The rotor 12 includes an amagnetic material (aluminum) annular part 50 carrying the blade wheel 19 and the intermediate mounting part 14. It also supports the rotor part of the magnetofluidic suspension system. To be more precise, it accommodates a third polepiece 52 of the ferromagnetic circuit which itself includes an annular recess in which is housed a flat annular part 54 facing the amagnetic material part 44 of the stator. The facing face of the stator is covered with a ceramic coating 56 and forms the other plane surface of the fluidic bearing 46. In operation, the two plane surfaces delimit a laminar space 58 into which air is injected continuously from the annular chamber 45 to maintain the rotor at a given axial distance from the stator. The magnetic circuit tends to oppose the existence of this laminar space between the rotor and the stator by attracting the rotor towards the stator. The ceramic coating prevents damage to the fluidic bearing should the air pressure disappear when the rotor is rotating at high speed.

The magnetic circuit 35 as described hereinabove has an airgap 60 in substantially the same plane as the laminar space 58 and on either side of the latter. The airgap is defined between the polepiece 38 of the stator and the polepiece 52 of the rotor, radially outside the fluidic bearing and between the polepiece 40 of the stator and the polepiece 52 of the rotor, radially inside the fluidic bearing. The polepieces 38, 40 and 52 include facing centering members positioned manually and on opposite sides of the airgap 60 to channel the magnetic flux between them via said airgap 60 and thus to generate a return force upon radial displacement of the rotor relative to the stator.

Note that with the arrangement just described the magnetic circuit advantageously includes a single annular magnet 36 centered on the theoretical rotation axis of the rotor. Any lack of magnetic homogeneity in this magnet is automatically corrected at the airgap by the ferromagnetic material polepieces. Accordingly, the magnetic axis of the system is always coincident with the axis x—x. Moreover, the magnet 36 is housed in the stator and so is not subjected to any centrifugal force. It has two parallel flat pole faces respectively in contact with the annular polepieces 38 and 40 of the ferromagnetic circuit.

The centering members mentioned above are annular ribs 62a, 62b, 63a, 63b of the ferromagnetic circuit, arranged coaxially in facing pairs in the rotor and the stator. To be more precise, the ribs 62a are on the polepiece 38 of the stator, the ribs 63a are on the polepiece 40 of the stator near its inside edge and the ribs 62b, 63b are on the polepiece 52 of the rotor, near its outside edge and its inside edge, respectively.

Accordingly, the first polepiece 38 contiguous with one of the poles of the magnet 36 is provided with a first group of at least two annular ribs 62a radially outside the fluidic bearing and the second polepiece 40 contiguous with the other pole of the magnet is provided with a second group of at least two annular ribs 63a radially inside the fluidic bearing. In the rotor 12, the third polepiece 52 is provided with two groups of at least two annular ribs 62b, 63b respectively radially outside and radially inside the fluidic bearing facing the ribs of said first and second groups of ribs of the stator.

Figure 2:
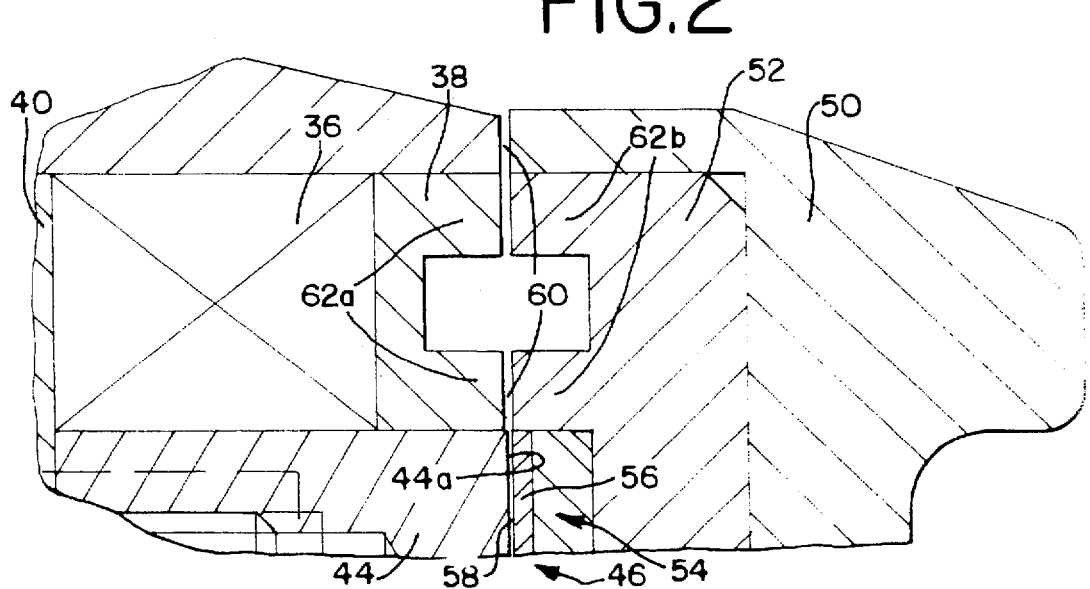
FIG. 2 shows the detail II from FIG. 1 to a larger scale.

FIG. 2 shows that the magnetic airgap 60 is wider than the laminar space 58 of the fluidic bearing. The size of this airgap can be defined with great precision by machining the facing faces of the annular ribs of the rotor and of the stator in situ with a respective predetermined offset relative to the two plane surfaces 44a, 56 delimiting the laminar space 58 of the fluidic bearing.

The fact that there is only one magnet in all of the magnetic circuit is advantageous. It is possible to magnetize said magnet in a simple way after it is fitted into the stator, at the end of the fabrication of the latter and in particular after machining the faces of the polepieces that determine the airgap. This avoids the accumulation of miniscule particles or chips of ferromagnetic material and the stator is easy to clean during and after machining. The magnetization of the magnet in situ can therefore be the last operation of fabrication of the stator; it is sufficient to place it in a magnetizing coil generating an axially oriented field.

This in situ magnetization would be technically very difficult if there were several magnets in the stator and/or the rotor, with opposite directions of magnetization.

This is why, in this type of turbine with more than one magnet, it is generally preferred to magnetize the magnets before they are fitted, with the risk that they will attract and retain ferromagnetic particles during subsequent fabrication operation.

In operation, the magnetic circuit develops an axial attraction force between the rotor and the stator which balances the repulsion force between these two same members exerted by the fluidic bearing. The magnetic airgap stabilizes at a value in the order of one tenth of a millimeter whereas said laminar space of the fluidic bearing has a width in the order of 20 microns. Any offcentering of the rotor relative to the stator generates return forces between the facing annular ribs leading to rapid recentering. The fact that the annular ribs are on opposite sides of the fluidic bearing 46 provides a better balancing of the thrust forces (fluidic) and traction forces (magnetic). The magnetic forces are equalized on opposite sides of the fluidic bearing by providing wider annular ribs on the inside than on the outside. Moreover, the mild steel polepiece 52 housed in the rotor stiffens it and reduces the risk of it deforming.

There is claimed:

1. A magnetofluidic suspension turbine comprising a stator, a rotor, a radial fluidic bearing defined between said rotor and said stator, fluid injection means for injecting fluid into a laminar space between two respective facing plane surfaces of said rotor and of said stator, and a magnetic circuit part of which is in said rotor and part of which is in said stator and which includes an airgap in substantially the same plane as said laminar space, a magnet and a ferromagnetic circuit coupled to said magnet and including facing centering members on opposite sides of said airgap to channel the magnetic flux between them via said airgap and to generate a return force upon radial displacement of said rotor relative to said stator.

2. A turbine as claimed in claim 1 including a single annular magnet centered on a theoretical rotation axis of said rotor.

3. The turbine claimed in claim 2 wherein said magnet is housed in said stator.

4. The turbine claimed in claim 3 wherein said magnet has two parallel flat pole faces in contact with polepieces of said ferromagnetic circuit.

5. The turbine claimed in claim 1 wherein said centering members are annular ribs of said ferromagnetic circuit arranged coaxially in facing pairs in said rotor and said stator.

6. The turbine claimed in claim 5 wherein said annular ribs in said rotor and in said stator are defined radially inside and radially outside said fluidic bearing.

7. The turbine claimed in claim 6 wherein said fluidic bearing includes an annular amagnetic material part in said stator surrounded by parts of said magnetic circuit and in which is defined an annular distribution chamber connected to a source of fluid under pressure and communicating with said laminar space through a series of small holes around a circle centered on said theoretical rotation axis of said rotor.

8. The turbine claimed in claim 6 wherein said ferromagnetic circuit includes a first annular polepiece in said stator contiguous with one pole of said magnet and provided with a first group of at least two of the aforementioned annular ribs disposed radially outside said fluidic bearing, a second annular polepiece contiguous with the other pole of said magnet and provided with a second group of at least two of the aforementioned annular ribs disposed radially inside said fluidic bearing, and a third polepiece in said rotor provided with two groups of at least two annular ribs respectively radially outside and radially inside said fluidic bearing and facing said ribs of said first and second groups of said stator.

9. The turbine claimed in claim 8 wherein said facing faces of said annular ribs of said rotor and said stator are machined in situ with a respective predetermined axial offset relative to said two plane surfaces delimiting said laminar space of said fluidic bearing.

10. A turbine as claimed in claim 1 wherein said rotor carries a blade wheel housed in an axial cavity of said stator and the latter includes air injectors discharging into said axial cavity facing the blades of said blade wheel.

11. The turbine claimed in claim 10 wherein said blade wheel has a central part in the form of a sleeve provided with slots extending parallel to its axial direction and having an external bead engaged in an internal groove of said rotor.

12. A turbine as claimed in claim 1 wherein said rotor carries a coating product sprayer member.

13. A turbine as claimed in claim 1 including a single annular magnet centered on a theoretical rotation axis of said rotor and wherein said magnet is magnetized in situ at the end of the process of manufacturing said stator.

* * * * *